United States Patent Office 3,377,319
Patented Apr. 9, 1968

3,377,319
METHOD OF PREPARING POLYTETRA-METHYLENE NAPHTHALENE DICARBOXYLATE POLYESTERS
Maria V. Wiener, Akron, Ohio, assignor to The Goodyear Tire & Rubber Company, Akron, Ohio, a corporation of Ohio
No Drawing. Filed Mar. 10, 1964, Ser. No. 350,683
4 Claims. (Cl. 260—75)

ABSTRACT OF THE DISCLOSURE

This invention relates to the condensation process for the preparation of polytetramethylene naphthalene dicarboxylate polyesters using a soluble lead compound and a soluble antimony compound as catalysts.

This invention relates to an improved process for the manufacture of polymeric tetramethylene naphthalene dicarboxylates.

Highly polymeric tetramethylene naphthalene dicarboxylates are high melting linear polyester resins which have excellent fiber and film-forming properties. These highly polymeric resins are difficult to prepare by ester interchange and condensation processes because the bis esters of the acids and tetramethylene glycol form relatively low molecular weight polymer and tetrahydrofuran under the conditions commonly used in ester interchange and condensation processes.

Now, unexpectedly, it has been found that highly polymeric tetramethylene naphthalene dicarboxylic resins can be prepared from bis esters of the naphthalene dicarboxylic acids and tetramethylene glycol using specific catalysts and particular reaction conditions. Thus it has been found that high molecular weight polytetramethylene naphthalene dicarboxylates are obtained when tetramethylene glycol and a bis naphthalene dicarboxylic acid ester are subjected to ester interchange reaction, the ester interchange reaction has been carried substantially to completion in the presence of a soluble lead compound and a soluble antimony compound at a temperature in the range of from 245° C. to 265° C. at atmospheric pressure and the tetramethylene glycol esters formed are condensed at a temperature in the range of from 250° C. to 270° C. at a pressure below five millimeters of mercury pressure.

The invention is illustrated by the following examples:

A glass reaction vessel in the shape of a tube approximately 35 centimeters long having an inside diameter of 38 millimeters, equipped with a side arm, a nitrogen gas inlet tube and a stirrer was charged with 24.4 grams of dimethyl 2,6-naphthalate, 22 grams of tetramethylene glycol and 0.05 gram of lead diacetate trihydrate. The mixture was stirred and heated by means of a vapor bath boiling at 245° C. while a slow stream of oxygen-free nitrogen gas was passed into the vessel and over the reaction mixture. Methanol released was distilled out of the mixture. After 47 minutes of reaction at 245° C. at atmospheric pressure 0.035 gram of antimony trioxide was added and the temperature of the vapor bath was raised to 265° C. The mixture was heated at this temperature for 85 minutes. During the ester interchange time only the lower part of the reactor was heated so that the tetramethylene glycol would very gently reflux while methanol distilled over. After the ester interchange reaction was completed the pressure in the system was slowly reduced over a period of 30 minutes to approximatly one millimeter of mercury pressure. Heating at 265° C. was continued and tetramethylene glycol was distilled out of the reactor. The condensation polymerization reaction was run at one millimeter of mercury pressure at 265° C. for one hour and 50 minutes. At the end of this time the polymer formed had an intrinsic viscosity of 0.727 and a melting point of 241° C. The polymer crystallized readily and could be easily drawn to form fibers. A small sample of the polymer was processed to form an oriented film which had high tensile strength.

In a control run in which a soluble lead compound was used as the sole catalyst the polymer formed attained an intrinsic viscosity of 0.469. In another run in which a mixture of litharge and calcium acetate was used as the catalyst the polymer attained an intrinsic viscosity of 0.347.

The example illustrates the invention particularly with respect to the use of the dimethyl esters of the 2,6-naphthalic acid. The invention can also be used with the dimethyl esters of the various isomeric naphthalene dicarboxylic acids, such as the 1,2-; 1,4-; 1,5-; 2,7- and other isomers. Also, other esters such as the ethyl, propyl, butyl and phenyl ester of the naphthalene dicarboxylic acid can be used.

The catalysts used in the invention are soluble compounds, i.e., compounds that are soluble in the mixture of reactants. The amount of the catalyst used can be varied over wide concentrations. As is usual in catalysts, the amount will be relatively small. As a general rule the amount of each of the soluble lead and antimony catalysts will be within the range of 0.005 to 1.0 percent based on the ester of naphthalene dicarboxylic acid used. Generally from 0.1 to 0.3 percent of the soluble lead catalyst, and 0.05 to 0.25 percent of the soluble antimony catalyst based on the ester of naphthalic acid used gives a satisfactory reaction rate and a product of suitable color, but other quantities may be used.

The example illustrates the invention particularly with respect to the use of lead acetate and antimony trioxide as the soluble catalysts. Other soluble compounds can be used. Representative examples of such compounds are the salts of organic acids such as lead formate, lead propionate and lead octoate, alcoholates such as lead ethylate, lead butylate, lead glycolates such as lead ethylene glycolate and lead tetramethylene glycolate, and other soluble lead compounds such as litharge and lead dioxide. In addition to the use of antimony trioxide shown in the example, other soluble antimony compounds such as antimony ethylate, antimony propylate, antimony glycolate and antimony acetate can be used. The invention is in the use of the combination of the soluble lead compound and the soluble antimony compound for preparing the high molecular weight polytetramethylene naphthalene dicarboxylate polymer. The term "high molecular weight polyester" is used in the present specification and claims to mean polyesters having an intrinsic viscosity of at least 0.5 as determined in a 60/40 phenol-tetrachloroethane mixed solvent at 30.0° C.

The example illustrates the process in which the addition of the soluble antimony compound was made after the ester interchange reaction was started but prior to its completion. If desired, the antimony compound can be added to the reactants before the beginning of the ester interchange reaction. The ester interchange reaction is substantially completed at a temperature above about 245° C., usually in the range of from about 245° C. to 265° C. Generally the ester interchange reaction is completed at a temperature in the range of from 255° C. to 265° C. at atmospheric pressure. The condensation polymerization is carried out in molten state at a temperature below 270° C. at a pressure below five millimeters of mercury pressure, usually at a temperature in the range of from 250° C. to 270° C. at a pressure below one millimeter of mercury pressure. If desired, the condensation polymerization can be carried out according to the solid state polymerization method in which the polymer is polymerized to at least a low molecular weight polymer, usually to an intrinsic viscosity of at least 0.2, by the melt process, cooled and ground into small particles which are heated at a temperature below the sticking temperature of the polymer at reduced pressure or at atmospheric pressure and an inert gas is passed over the polymer to remove volatile materials that are given off as the resin polymerizes. Thus in the present case the resin would be heated at about 220° C. (or at lower temperature if so preferred) and polymerized to the desired molecular weight in the solid state process.

While certain representative embodiments and details have been shown for the purpose of illustrating the invention it will be apparent to those skilled in this art that various changes and modifications may be made therein without departing from the spirit or scope of the invention.

What I claim is:

1. The process of preparing polytetramethylene naphthalene dicarboxylate polyesters having an intrinsic viscosity of at least 0.50 as determined in a 60/40 phenol-tetrachloroethane mixed solvent at 30.0° C. which comprises subjecting a bis ester of naphthalene dicarboxylic acid selected from the group consisting of methyl, ethyl, propyl, butyl and phenyl esters to ester interchange reaction with tetramethylene glycol in the presence of a (A) soluble lead compound selected from the group consisting of litharge, lead dioxide, lead acetate, lead formate, lead alcoholate and lead glycolate and (B) a soluble antimony catalyst selected from the group consisting of antimony trioxide, antimony glycolate and antimony acetate and completing the ester interchange at a temperature in the range of about 245° C. to 265° C., distilling out the alcohol released and condensing the glycol esters formed with elimination of tetramethylene glycol at a temperature below about 270° C. at a pressure below about five millimeters of mercury pressure to form a polymeric polyester which is capable of being formed into fibers and films.

2. The process of claim 1 in which the naphthalene dicarboxylate is a bis ester of 2,6-naphthalic acid.

3. The process of claim 1 in which the condensation polymerization is carried out at a temperature in the range of from 250° C. to 270° C.

4. The process of claim 1 in which the condensation polymerization is carried in the melt stage to form a polymer having an intrinsic viscosity of at least 0.2 and this polymer is further polymerized by the solid state polymerization process at a temperature of about 220° C.

References Cited

UNITED STATES PATENTS 3,053,810  9/1962  Griehl et al. _____ 260—75

OTHER REFERENCES

Bjorksten et al.: Polyesters and Their Applications, copyright 1956, pp. 201 and 204.

WILLIAM H. SHORT, *Primary Examiner.*

R. T. LYON, *Assistant Examiner.*